United States Patent [19]
Gilman

[11] Patent Number: 5,296,676
[45] Date of Patent: Mar. 22, 1994

[54] WELDING OF ALUMINUM POWDER ALLOY PRODUCTS

[75] Inventor: Paul S. Gilman, Rockland, N.Y.

[73] Assignee: AlliedSignal Inc., Morristown, Morris, N.J.

[21] Appl. No.: 63,811

[22] Filed: May 20, 1993

[51] Int. Cl.$^5$ .......................... B23K 9/167; B23K 9/23
[52] U.S. Cl. ............................ 219/137 WM; 219/75; 219/137 PS
[58] Field of Search ................. 219/74, 75, 137 WM, 219/137 PS, 128, 130.51; 148/415

[56] References Cited

U.S. PATENT DOCUMENTS

| | | | |
|---|---|---|---|
| 2,804,885 | 9/1957 | Mott | 219/74 |
| 2,856,510 | 10/1958 | Jones et al. | 219/74 |
| 2,963,780 | 12/1960 | Lyle et al. | |
| 2,967,351 | 12/1956 | Roberts et al. | |
| 3,450,857 | 6/1961 | Webb | 219/74 |
| 3,462,248 | 8/1969 | Roberts et al. | |
| 4,347,076 | 9/1982 | Ray et al. | |
| 4,379,719 | 4/1983 | Hildeman et al. | |
| 4,625,095 | 11/1986 | Das | 219/137 WM |
| 4,647,321 | 3/1987 | Adam | |
| 4,729,790 | 3/1988 | Skinner | |
| 4,799,974 | 1/1989 | Mahoney et al. | 148/415 |
| 4,869,751 | 9/1989 | Zedalis et al. | |
| 4,878,967 | 11/1989 | Adam et al. | |
| 4,898,612 | 2/1990 | Gilman et al. | |

FOREIGN PATENT DOCUMENTS 2024276 1/1971 Fed. Rep. of Germany .................. 219/130.51
55-45521 3/1980 Japan .................... 219/74

OTHER PUBLICATIONS

Gas Tungsten Arc Welding of Al-10Fe-5Ce, Guinn Metzger, Report No. AFWAL-TR-87-4037, AFWAL/MLLS, Wright-Patterson AFB, OH 45433, Feb. 1987.

U.S. patent application Ser. No. 650,122, filed Feb. 4, 1991, of Gilman.

*Primary Examiner*—Clifford C. Shaw
*Attorney, Agent, or Firm*—Ernest D. Buff; Roger H. Criss

[57] ABSTRACT

A TIG weld produced from a rapidly solidified dispersion strengthened aluminum base alloy exhibits attributes of the alloy's microstructure extant prior to formation of the weld. TIG welding power is adjusted to minimize energy input into the weld. An arc gas contacts the weld to maximize rapid quenching thereof, while a second gas contacts the undersurface of the weld so that the undersurface of the weld is quenched. Cooling of the weld is further enhanced by a trailing gas selected from the group consisting of argon, nitrogen, helium, carbon dioxide and mixtures thereof.

17 Claims, 3 Drawing Sheets

50X

50X

50X

WELDING OF ALUMINUM POWDER ALLOY PRODUCTS

BACKGROUND OF THE INVENTION

1. Field of the Invention

The present invention relates to dispersion strengthened aluminum-base alloys, and more particularly to a method for tungsten inert gas welding of these alloys.

2. Description of the Prior Art

In recent years the aerospace industry has searched for high temperature aluminum alloys to replace titanium and existing aluminum alloys in applications requiring operating temperatures approaching 350° C. While high strength at ambient and elevated temperatures is a primary requirement, certain design applications mandate that candidate alloys also exhibit, in combination, ductility, toughness, fatigue and corrosion resistance, as well as lower density than the materials currently being used.

To date, the majority of aluminum base alloys being considered for elevated temperature applications are produced by rapid solidification. Such processes typically produce homogeneous materials, and permit control of chemical composition by providing for incorporation of strengthening dispersoids into the alloy at sizes and volume fractions unattainable by conventional ingot metallurgy. Processes for producing chemical compositions of aluminum base alloys for elevated temperature applications have been described in U.S. Pat. No. 2,963,780 to Lyle et al., U.S. Pat. No. 2,967,351 to Roberts et al., U.S. Pat. No. 3,462,248 to Roberts et al., U.S. Pat. No. 4,379,719 to Hildeman et al., U.S. Pat. No. 4,347,076 to Ray et al., U.S. Pat. No. 4,647,321 and U.S. Pat. No. 4,878,967 to Adam et al. and U.S. Pat. No. 4,729,790 to Skinner et al. The alloys taught by Lyle et al., Roberts et al. and Hildeman et al. were produced by atomizing liquid metals into finely divided droplets by high velocity gas streams. The droplets were cooled by convective cooling at a rate of approximately $10^{4°}$ C./sec. Alternatively, the alloys taught by Adam et al., Ray et al. and Skinner et al. were produced by ejecting and solidifying a liquid metal stream onto a rapidly moving substrate. The produced ribbon is cooled by conductive cooling at rates in the range of $10^{5°}$ to $10^{7°}$ C./sec. In general, the cooling rates achievable by both atomization and melt spinning greatly reduce the size of intermetallic dispersoids formed during the solidification. Furthermore, engineering alloys containing substantially higher quantities of transition elements are able to be produced by rapid solidification with mechanical properties superior to those previously produced by conventional solidification processes.

Conversion of rapidly solidified aluminum base alloys disclosed in the aforementioned inventions and particularly those taught in U.S. Pat. No. 4,878,967 and U.S. Pat. No. 4,729,790 are accomplished by the processes disclosed in U.S. Pat. No. 4,869,751, U.S. Pat. No. 4,898,612. In U.S. Pat. No. 4,869,751 to Zedalis et al. there is disclosed a dispersion strengthened, non-heat treatable aluminum base alloy formed into useful shapes that include extrusions, forgings and sheet. U.S. Pat. No. 4,898,612 to Gilman et al. discloses use of a friction actuated process to fabricate extrusions directly from rapidly solidified aluminum base alloy powder.

One of the major restrictions to the widespread utilization of high temperature aluminum alloys is their inability to be joined using welding or brazing technologies. The application of conventional welding and brazing practices to conventionally processed high performance aluminum alloys results in the formation of excessive porosity in the weld and heat affected zone of the joint due to the outgassing of the alloy during the joining cycle and the coalescence of the gases to form porosity. The excessive gas porosity is caused in part by the presence of hydrogen, as hydrate, hydroxide or water, in the base metal. Also, the slow cooling of the welded area may favor the formation of coarse, brittle intermetallics which will severely reduce the joint strength and ductility when compared to the base metal. Finally, any treatment given to these alloys to improve their weldability must be cost effective.

The hydrogen content may be reduced by heat treatment of the high temperature aluminum alloy in vacuum at high temperature. However, excessive heat treatment causes a reduction of the base metal strength. Previous disclosures have shown that the weld porosity in powder metallurgy aluminum alloys (Al-10Fe-5Ce) can be virtually eliminated by a combination of preweld vacuum heat treatment, i.e. 750° F. for 24 hrs. in vacuum, and direct current electrode negative welding, with only a minor decrease in base metal tensile strength. However, the welds exhibit a brittle behavior due to brittle phases formed near the weld interface. These welds are restricted to non-structural applications. (Gas Tungsten Arc Welding of Al-10Fe-5Ce, Guinn Metzger, report No. AFWAL-TR-87-4037, AFWAL/MLLS, Wright-Patterson AFB, OH 45433, February 1987).

U.S. Pat. application of Gilman, Ser. No. 650,122, filed Feb. 4, 1991 now pending, discloses a process for reducing the gas levels of rapidly solidified aluminum alloys by subjecting a compacted billet having a density varying from 70% to 98% of full density to a vacuum autoclaving treatment at 350° C. to the incipient melting point of the alloy. While these techniques have been successful in eliminating the porosity generated from the welding process, the weldments are still subject to the formation of the coarse brittle intermetallics which will severely reduce the joint strength and ductility when compared to the base metal. Also, the high temperature properties of these alloys may be compromised by the formation of the coarse intermetallics.

Considering the dependency of their superior mechanical properties on the special microstructures of these rapidly solidified, dispersion strengthened alloys, it is apparent that joining techniques which can recreate and/or retain the unique microstuctural characteristics of the base metal need to be utilized in order to achieve high joint efficiency. Current references sight that among the fusion welding processes currently available to join aluminum alloys, high energy density processes such as electron beam and laser welding offer the greatest potential for achieving the recreation and/or retention of the rapidly solidified microstructure.

Gas tungsten-arc welding (TIG welding) is an arc welding process in which the heat is produced between a nonconsuming electrode and the work metal. The electrode, the weld puddle, the arc, and adjacent heated areas of the work piece are protected from atmospheric contamination by a gaseous shield. Typically the high energy densities and low total energy inputs needed for the welding of rapidly solidified, dispersion strengthened aluminum are not attainable through TIG welding.

The need remains in the art for a process for welding rapidly solidified, dispersion strengthened aluminum base alloys while retaining useful mechanical properties.

SUMMARY OF THE INVENTION

The present invention provides a process for tungsten inert gas welding of a dispersion strengthened aluminum base alloy. The TIG welding practice of the present invention is such that the formation of coarse brittle intermetallics characteristic of prior art processes and whose formation severely reduces the joint strength and ductility of the weldment when compared to the base metal are significantly reduced or eliminated. The process of the present invention advangageously achieves the desired weld structure by employing a high power density and low total energy input into the weld through selection of an appropriate weld power supply, and proper gas shielding of the weld. Under these conditions, the quench rate is maximized, allowing a rapidly solidified structure to be formed in the weld itself. Advantageously, in accordance with the present invention, rapidly solidified, dispersion strengthened aluminum base alloys are welded in an economical, efficient manner, and the useful mechanical properties thereof are retained.

In one aspect of the present invention a weld is produced from a rapidly solidified dispersion strengthened aluminum alloy. Specifically, the alloy is TIG welded by a process comprising the steps of:
  a. adjusting TIG welding power to minimize energy input into the weld;
  b. contacting said weld with an arc gas composition adapted to maximize rapid quenching of the weld;
  c. contacting said weld with a second gas, the contact being predominantly at the undersurface thereof, so that the undersurface of the weld is quenched; and
  d. contacting said weld with a trailing gas to enhance cooling of the weld beyond that achieved by the arc gas and the second gas.

Examples of TIG welding power supplies that minimize the energy input into the weld include but are not limited to those utilizing inverter technology that produces pulsed AC waveforms that increase response speed. The pulsed inverter power supplies produce a highly stable arc, with minimum current, that is maintained by square-wave AC pulses that are completely different from conventional alternating current. This type of arc is advantageous for the welding of thin aluminum sheets, which process is usually difficult, and it allows high speed welding. Also the pulsed inverters produce a more concentrated arc which allows greater precision of the energy input into the weld. This characteristic is critical to controlling the rapidly solidified nature of the weld. This is accomplished because the high speed pulses, from 10 to 500 Hz converges the arc to a very fine point while, at the same time, the stability of the arc is increased. Finally, the high pulse rates enhance the cleaning of the electrode allowing the reverse or cleaning cycle of the weld to be reduced. This again decreases the amount of energy input into the system.

The purpose of controlling the arc gas mixture and various gas mixtures not only to the welding arc, but to the underside of the weld and directly to the weld itself act to enhance the cooling rate of the weld so that a rapidly solidified structure can be achieved in the weld. The types of fixtures and gas nozzles used to shield both the front and back of the weld are varied and depend on the configuration of the component to be welded and the type of joint that is to be formed. The arc gas composition is either argon or helium or a mixture of the two. The cover gas used to protect and quench the underside of the weld is either argon, nitrogen, helium or carbon dioxide or some combination of two or more of these gases. To increase the quench rate of the fixture, the fixture itself may be cooled. The cover gas applied by the trailing gas nozzle is either argon, nitrogen, helium or carbon dioxide or some combination of two or more of these gases. Finally, the gas nozzle can be in physical contact with the weldment, thereby quenching the weldment by conduction.

It has been discovered that rapidly solidified, dispersion strengthened aluminum base alloys upon being subjected to the welding techniques set forth above develop microstructures in the weldments that are substantially equivalent to the base metal and achieve mechanical properties that are equivalent or superior to those developed by more exotic and restrictive welding techniques such as laser or E-beam welding which are limited to simple geometries such as flat surfaces and require specialized equipment such as large vacuum chambers for welding. TIG welding is desirable by industry because of its ease of application and wide spread deployment.

Alloys preferred for use in the TIG welding of this invention are those high temperature aluminum alloys disclosed in U.S. Pat. No. 4,878,967 and the wrought products disclosed in U.S. Pat. No. 4,869,751 and U.S. Pat. No. 4,898,612, which result therefrom.

BRIEF DESCRIPTION OF THE DRAWINGS

The invention will be more fully understood and further advantages will become apparent when reference is made to the following detailed description of the preferred embodiments of the invention and the accompanying drawings, in which.

DESCRIPTION OF THE PREFERRED EMBODIMENTS

Figure 1:
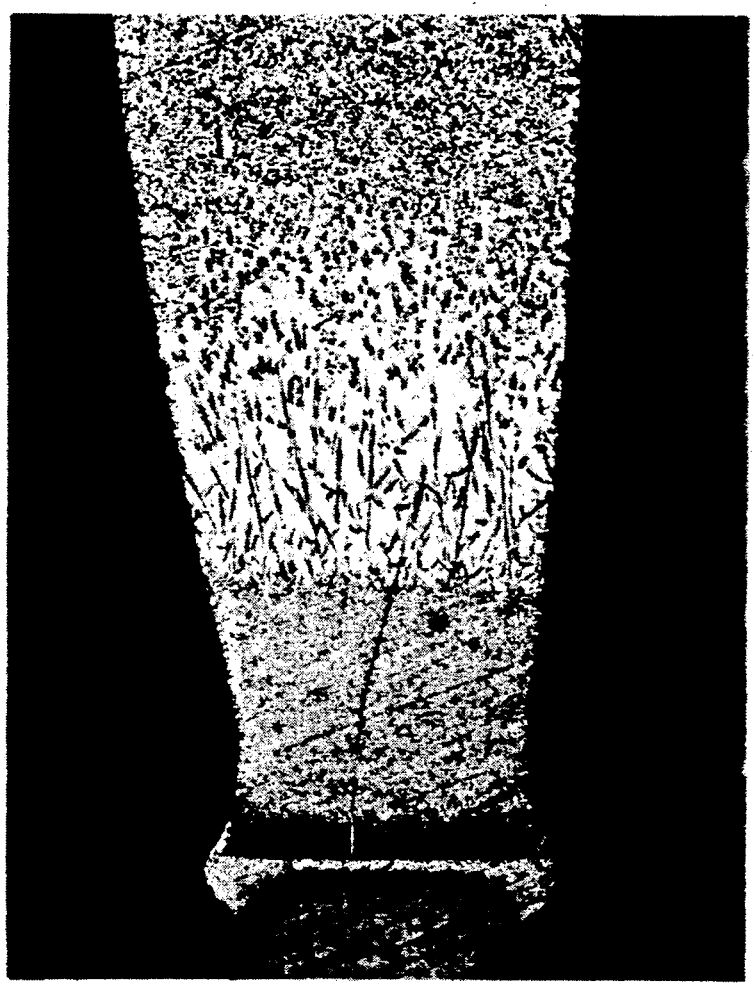
FIG. 1 is photomicrograph of the cross-section of a butt joint TIG weld in sheet.

The present invention provides a procedure for TIG welding a rapidly solidified dispersion strengthened aluminum base alloy product Generally stated, the TIG welding is performed by utilizing a TIG power supply that minimizes the energy necessary for welding, employing an optimum combination of shielding gases that will cool the weld as quickly as possible, and properly fixturing the joint so that a quenching gas is applied predominantly to the underside of the weld at a point immediately trailing the weld. Preferably a pulsed AC inverter power supply is utilized because of its ability to form a condensed arc at high pulse rates thereby reducing the energy needed for welding. The arc and shielding gases are preferably selected from the group consisting of helium, argon or a mixture thereof that provides the required maximum quench rates. Finally, fixturing and trailer nozzles are utilized to optimize ease of welding, and their placement and design will vary, depending on the weld configuration and component geometry. Typical quenching and shielding gases are selected from the group consisting of argon, helium, nitrogen, carbon dioxide and mixtures thereof.

In a preferred embodiment, alloys suitable for use with the process of the present invention are those rapidly solidified aluminum alloys described in U.S. Pat. No. 4,879,967, which alloys consist essentially of the formula $Al_{bal}Fe_aSi_bX_c$, wherein X is at least one element selected from the group consisting of Mn, V, Cr, Mo, W, Nb, Ta, "a" ranges from 2.0 to 7.5 at %, "b" ranges from 0.5 to 3.0 at %, "c" ranges from 0.05 to 3.5 at % and the balance is aluminum plus incidental impurities, with the proviso that the ratio [Fe+X]:Si ranges from about 2.0:1 to 5.0:1.

Another aluminum base, rapidly solidified alloy suitable for use in the process of the invention has a composition consisting essentially of the formula $Al_{bal}Fe_aSi_bX_c$ wherein X is at least one element selected from the group consisting of Mn, V, Cr, Mo, W, Nb, Ta, "all" ranges from 1.5 to 7.5 at %, "b" ranges from 0.75 to 9.0 at %, "c" ranges from 0.25 to 4.5 at % and the balance is aluminum plus incidental impurities, with the proviso that the ratio [Fe+X]:Si ranges from about 2.01:1 to 1.0:1.

Still another aluminum base, rapidly solidified alloy that is suitable for use in the process of the invention has a composition range consisting essentially of about 2-15 at % from a group consisting of zirconium, hafnium, titanium, vanadium, niobium, tantalum, erbium, about 0.5 at % calcium, about 0-5 at % germanium, about 0-2 at % boron, the balance being aluminum plus incidental impurities.

A low density aluminum-lithium base, rapidly solidified alloy suitable for use in the present process has a composition consisting essentially of the formula $Al_{bal}Zr_aLi_bMg_cT_d$, wherein T is at least one element selected from the group consisting of Cu, Si, Sc, Ti, B, Hf, Be, Cr, Mn, Fe, Co and Ni, "a" ranges from about 0.05-0.75 at %, "b" ranges from about 9.0-17.75 at %, "c" ranges from about 0.45-8.5 at % and "d" ranges from about 0.05-13 at %, the balance being aluminum plus incidental impurities.

The aluminum base, rapidly solidified alloys mentioned above may also be combined with a reinforcing phase to form a metal matrix composite. Also, the present invention is not limited to single types of reinforcements or single phase matrix alloys but can comprise a plurality of types of reinforcing particles, or a plurality of phases of matrix alloys.

To provide the desired levels of strength, toughness and ductility needed for commercially useful applications, the alloys of the invention were rapidly solidified at cooling rates sufficient to greatly reduce the size of the intermetallic dispersoids formed during the solidification as well as allow for substantially higher quantities of transition elements to be added than possible by conventional solidification processes. The rapid solidification process is one wherein the alloy is placed into a molten state and then cooled at a quench rate of at least about $10^5$ to $10^7$ C./sec to form a solid substance. Preferably this method should cool the molten metal at a rate of greater than about $10^{6°}$ C./sec, i.e., via melt spinning, splat cooling or planar flow casting, which forms a solid ribbon. These alloys have an as-cast microstructure which varies from a microeutectic to a microcellular structure, depending on the specific alloy chemistry. In the present invention, the relative proportions of these structures are not critical.

Ribbons of said alloy are formed into particles by conventional comminution devices such as a pulverizer, knife mills, rotating hammer mills and the like. Preferably, the comminuted powder particles have a size ranging from about −40 mesh to about −200 mesh, U.S. standard sieve size.

The particles may then be canless vacuum hot pressed at a temperature ranging from about 275° C. to 550° C., preferably ranging from about 300° C. to 500° C., in a vacuum less than $10^{-4}$ torr ($1.33 \times 10^{-2}$ Pa), preferably less than $10^{-5}$ torr ($1.33 \times 10^{-2}$ Pa), and then compacted in a blind die. Those skilled in the art will appreciate that compaction may also be performed by placing the comminuted powder in metal cans, such as aluminum cans having a diameter as large as 30 cm or more, hot degassed in the can under the aforementioned conditions, sealed therein under vacuum, and then thereafter re-heated within the can and compacted to near full density, the compacting step being conducted, for example, in a blind die extrusion press. In general, any technique applicable to the art of powder metallurgy which does not invoke liquefying (melting) or partially liquefying (sintering) the matrix metal can be used.

Representative of such techniques are explosive compaction, cold isostatic pressing, hot isostatic pressing and conforming.

The wrought product is fabricated in accordance with the procedures disclosed by U.S. Pat. No. 4,869,751 and U.S. Pat. No. 4,898,612, the disclosures of which are incorporated herein by reference thereto.

In conversions from °F. to °C., the temperatures were rounded off, as were the conversions from ksi to MPa and inches to centimeters. Also, alloy compositions disclosed herein are nominal. With respect to conditions, for commercial production it is not practical or realistic to impose or require conditions extant in a research laboratory facility. Temperatures may vary, for example, by 25° C. of the target temperature disclosed herein. Thus, having a wider window for processing conditions adds to the practical value of the process.

This invention is further described herein, but is not limited by the examples given below. In all examples the test samples were fabricated from dispersion strengthened alloys comprising aluminum, iron, vanadium and silicon in the concentrations defined in U.S. Pat. No. 4,878,967, and prepared from rapidly solidified powders by the compaction and fabrication techniques described above. The specific techniques, conditions, materials, proportions and reported data set forth to illustrate the principles of the invention are exemplary and should not be construed as limiting the scope of the invention.

EXAMPLE I

A rapidly solidified, dispersion strengthened aluminum alloy sheet of 0.64 mm gage and having the nominal composition of 4.33 atomic % Fe, 0.73 atomic % V and 1.72 atomic % Si, aluminum balance (herein referred to as alloy A) was vacuum autoclaved for 450° C. for 24 hours to reduce the hydrogen level of the sheet for the purpose of eliminating the possibility of porosity formation on welding. The sheet stock was draw filed, cleaned by alkaline etch and deoxidizing, and then wire brushed prior to welding. The 25.4 mm wide sheet stock was butted together on a stainless steel backup bar and clamped with a stainless steel clamp. A conventional AC TIG welding power supply was used running at 10 to 85 volts with pure argon as the torch gas. These parameters are consistent with generally accepted procedures for the welding of aluminum alloy sheet. Strips of alloy A were used as the filler material.

The shear strength of the butt weld was measured to be 2135 N. The cross section of the weld was metallographically prepared and a photomicrograph taken, FIG. 1. Notice the formation of intermetallics as characterized by their large script or acicular like appearance in the weldment and heat affected zone of the weld. These large intermetallics are detrimental to the mechanical properties of the welded joint.

EXAMPLE II

A rapidly solidified, dispersion strengthened aluminum alloy sheet of 0.64 mm gage and having the nominal composition of 4.33 atomic % Fe, 0.73 atomic % V and 1.72 atomic % Si, aluminum balance (herein referred to as alloy A) was vacuum autoclaved for 450° C. for 24 hours to reduce the hydrogen level of the sheet for the purpose of eliminating the possibility of porosity formation on welding. The sheet stock was draw filed, cleaned by alkaline etch and deoxidizing, and then wire brushed prior to welding. The 25.4 mm wide sheet stock was butted together on a copper backup bar and clamped with a copper clamp. The copper backup bar was such that a cover gas could be applied to the underside of the welded joint. In addition a gas nozzle or gas lens was attached to the welding torch itself and was positioned to follow the weld. The gas lens allowed a cover gas to be applied directly to the welded joint following the welding itself. A double inverter AC pulsed arc welding machine was utilized. The power supply was operated in the hard arc mode for thin plate at a pulse rate of 500 Hz, average pulse current of 50 amps, a background current of 90 amps and argon was used as the torch gas. The backup gas was a mixture of argon at 0.57 m$^3$/hr and helium at 0.14 m$^3$/hr. The trailing gas applied by the gas lens was also a mixture of argon at 1.14 m$^3$/hr and helium at 0.28 m$^3$/hr. A 1.6 mm diameter rod of alloy 8009 was used as the filler metal. The rod was vacuum autoclaved for 450° C. for 24 hours to reduce the hydrogen level of the rod for the purpose of eliminating the possibility of porosity formation on welding.

Figure 2:
FIG. 2 is a photomicrograph of the cross-section of a butt joint TIG weld in sheet welded using an AC inverter power supply, shielding the back of the joint and utilizing a trailing gas nozzle to optimize the quench rate of the weld.

The shear strength of the butt weld was measured to be 6050 N. The cross section of the weld was metallographically prepared and a photomicrograph taken, FIG. 2. Notice the much finer microstructure of the weld and the heat affected zone as compared to the material traditionally TIG welded as in example I. Also the heat affected zone is much smaller than the heat affected zone found in Example I. The microstructure of the weld and heat affected zone is essentially equivalent to the desired rapidly solidified microstructure of the base metal. This desirable microstructure was achieved by employing the embodiments of this invention.

EXAMPLE III

A rapidly solidified, dispersion strengthened aluminum alloy sheet of 0.64 mm gage and having the nominal composition of 4.33 atomic % Fe, 0.73 atomic V and 1.72 atomic % Si, aluminum balance (herein referred to as alloy A) was butted together for autogenous laser welding using a Nd: YAG laser. The welding parameters were: 20 Hz pulse rate, 200 W pulse power and a 102 mm/minute weld travel rate. An argon shielding gas was applied to the backside of the weld using a groove backup plate.

Figure 3:
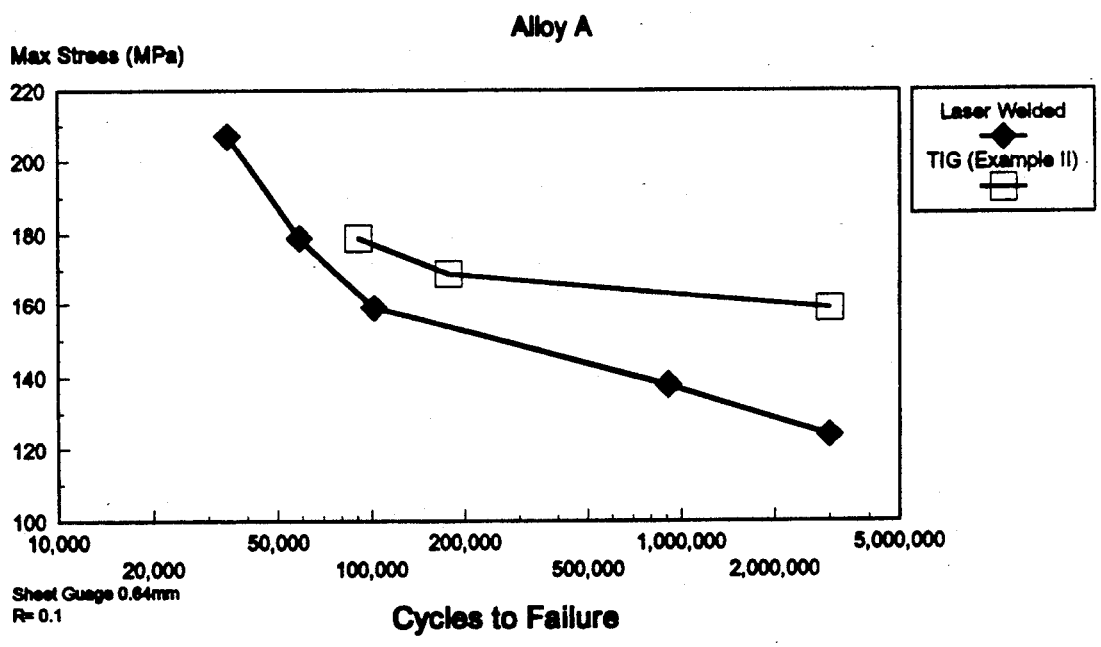
FIG. 3 is a plot of the high cycle fatigue life of a butt welded sheet TIG welded as in FIG. 2 compared to an autogenous laser welded butt joint.

The high cycle fatigue properties of the samples welded in this example and those welded as per Example II were measured. The fatigue testing parameters were a stress ratio of R=0.1, frequency of 61 Hz using a sinusoidal wave form and a test temperature of 24° C. The fatigue results are plotted in FIG. 3. Notice that the TIG welded samples of Example II have a higher fatigue strength than the laser welded samples of Example III. All of the TIG welded samples fractured in the weld, while the laser welded samples fractured in the weld or the heat affected zone. This result is contrary to current practice teaching that the only way to fusion weld a rapidly solidified, dispersion strengthened aluminum alloy is to utilize a high energy density welding process such as laser or electron beam welding.

Having thus described the invention in rather full detail, it will be understood that such detail need not be strictly adhered to but that various changes and modifications may suggest themselves to one skilled in the art, all falling within the scope of the invention as defined by the subjoined claims.

What is claimed:

1. A process for producing a weld by TIG welding a dispersion strengthened aluminum base alloy comprising the steps of:
   a. adjusting TIG welding power to minimize energy input into the weld;
   b. contacting said weld with an arc gas composition to maximize rapid quenching of the weld;
   c. contacting said weld with a second gas, the contact being predominantly at the undersurface of said weld, so that the undersurface of the weld is quenched; and
   d. contacting said weld with a trailing gas to enhance cooling of the weld beyond that achieved by said arc gas and said second gas.

2. A process recited by claim 1, wherein the said power supply is a pulsed inverter.

3. A process as recited by claim 1, wherein said arc gas has a composition selected from the group consisting of argon, helium and mixtures thereof.

4. A process as recited in claim 1, wherein said second gas is a gas mixture.

5. A process as recited by claim 4, wherein said trailing gas is selected from the group consisting of argon, nitrogen, helium, carbon dioxide and mixtures thereof.

6. A process as recited by claim 1, wherein said second gas is selected from the group consisting of argon, nitrogen, helium, carbon dioxide and mixtures thereof.

7. A process as recited in claim 1, wherein said joint is held by a cooled fixture.

8. A process as recited by claim 1, wherein the trailing gas is applied through a gas nozzle, and said nozzle quenches the weldment by conduction.

9. A process as recited by claim 1, wherein said aluminum base alloy has a composition consisting essentially of the formula $Al_{bal}Fe_aSi_bX_c$, wherein X is at least one element selected from the group consisting of Mn, V, Cr, Mo, W, Nb, Ta, "a" ranges from 2.0 to 7.5 at%, "b" ranges from 0.5 to 3.0 at%, "c" ranges from 0.05 to 3.5 at% and the balance is aluminum plus incidental impurities, with the proviso that the ratio [Fe+X]:Si ranges from about 2.0:1 to 5.0:1.

10. A process as recited by claim 1, wherein said aluminum base alloy has a composition consisting essentially of 4.33 atom percent iron, 0.73 atom percent vanadium, 1.72 atom percent silicon, the balance being aluminum.

11. A process as recited by claim 1, wherein said rapidly solidified aluminum base alloy is selected from the group consisting of the elements Al-Fe-V-Si, wherein the iron ranges from about 1.5-8.5 at%, vanadium ranges from about 0.25-4.25 at%, and silicon ranges from about 0.5-5.5 at%.

12. A process as recited by claim 1, wherein said rapidly solidified aluminum base alloy has a composition consisting essentially of the formula $Al_{bal}Fe_aSi_bX_c$, wherein X is at least one element selected from the group consisting of Mn, V, Cr, Mo, W, Nb, Ta, "a" ranges from 2.5 to 7.5 at%, "b" ranges from 0.75 to 9.0 at%, "c" ranges from 0.25 to 4.5 at% and the balance is aluminum plus incidental impurities, with the proviso that the ratio [Fe+X]:Si ranges from about 2.0:1 to 1.0:1.

13. A process as recited by claim 1, wherein said rapidly solidified aluminum base alloy has a composition consisting essentially of about 2-15 at% from a group consisting of zirconium, hafnium, titanium, vanadium, niobium, tantalum, erbium, about 0-5 at% calcium, about 0-5 at% germanium, about 0-2 at% boron, the balance being aluminum plus incidental impurities.

14. A process as recited by claim 1, wherein said rapidly solidified aluminum base alloy is selected from the group consisting essentially of the formula $Al_{bal}Zr_aLi_bMg_cT_d$, wherein T is at least one element selected from the group consisting of Cu, Si, Sc, Ti, B, Hf, Be, Cr, Mn, Fe, Co and Ni, "a" ranges from about 0.05-0.75 at%, "b" ranges from about 9.0-17.75 at%, "c" ranges from about 0.45-8.5 at% and "d" ranges from about 0.05-13 at%, the balance being aluminum plus incidental impurities.

15. A process as recited by claim 1, wherein said rapidly solidified aluminum alloy has combined therewith a reinforcing phase, forming a metal matrix composite.

16. A process as recited by claim 15, wherein said reinforcing phase comprises a plurality of phases of matrix alloys.

17. A process as recited by claim 15, wherein said reinforcing phase comprises a plurality of types of reinforcing particles.

* * * * *